United States Patent
Ahn et al.

(10) Patent No.: US 9,386,600 B2
(45) Date of Patent: Jul. 5, 2016

(54) APPARATUS AND METHOD FOR CONTROLLING COEXISTENCE INTERFERENCE WITHIN DEVICE IN WIRELESS COMMUNICATION SYSTEM

(75) Inventors: Jae Hyun Ahn, Seoul (KR); Ki Bum Kwon, Seoul (KR); Myung Cheul Jung, Seoul (KR)

(73) Assignee: Pantech Co., Ltd., Seoul (KR)

( * ) Notice: Subject to any disclaimer, the term of this patent is extended or adjusted under 35 U.S.C. 154(b) by 86 days.

(21) Appl. No.: 13/978,519

(22) PCT Filed: Jan. 6, 2012

(86) PCT No.: PCT/KR2012/000144
§ 371 (c)(1),
(2), (4) Date: Jul. 5, 2013

(87) PCT Pub. No.: WO2012/093884
PCT Pub. Date: Jul. 12, 2012

(65) Prior Publication Data
US 2013/0287009 A1     Oct. 31, 2013

(30) Foreign Application Priority Data
Jan. 7, 2011     (KR) ........................ 10-2011-0001971

(51) Int. Cl.
*H04W 16/14*     (2009.01)
*H04W 72/12*     (2009.01)
(Continued)

(52) U.S. Cl.
CPC .......... *H04W 72/1289* (2013.01); *H04W 16/14* (2013.01); *H04W 72/1226* (2013.01); *H04W 76/048* (2013.01); *H04W 88/06* (2013.01)

(58) Field of Classification Search
USPC .......................................................... 370/336
See application file for complete search history.

(56) References Cited

U.S. PATENT DOCUMENTS

2006/0274704 A1   12/2006   Desai et al.
2008/0186892 A1*   8/2008   Damnjanovic .... H04W 52/0216
                                                    370/311
(Continued)

FOREIGN PATENT DOCUMENTS

CN     101141155     3/2008
JP     2013-543686   12/2013
(Continued)

OTHER PUBLICATIONS

International Search Report issued on Aug. 27, 2012 in PCT Application No. PCT/KR2012/000144.
(Continued)

*Primary Examiner* — Charles C Jiang
*Assistant Examiner* — Kyaw Z Soe
(74) *Attorney, Agent, or Firm* — H.C. Park & Associates, PLC

(57) ABSTRACT

The present invention provides an apparatus and a method for controlling coexistence interference within a device in a wireless communication system. The method discloses the following steps: performing triggering, in which a transmission, which is generated in a terminal, in a first frequency band of a first network system requests controlling of interference on a reception, which is generated in the terminal, in a second frequency band of a second network system; transmitting to a base station support information including information on a time section that can or cannot be used by the first network system of the second network system, due to the interference; and receiving from the base station reply information for accepting or denying interference control as a reply to the support information.

12 Claims, 16 Drawing Sheets

(51) Int. Cl.
    *H04W 88/06*     (2009.01)
    *H04W 76/04*     (2009.01)

(56) References Cited

U.S. PATENT DOCUMENTS

| | | | | |
|---|---|---|---|---|
| 2011/0097998 | A1* | 4/2011 | Ko | H04W 72/1215 |
| | | | | 455/41.2 |
| 2011/0243047 | A1* | 10/2011 | Dayal | H04W 16/14 |
| | | | | 370/311 |
| 2012/0040620 | A1* | 2/2012 | Fu | H04B 1/1027 |
| | | | | 455/63.1 |
| 2013/0242919 | A1* | 9/2013 | Koo | H04W 72/082 |
| | | | | 370/329 |
| 2014/0031036 | A1* | 1/2014 | Koo | H04W 36/14 |
| | | | | 455/434 |

FOREIGN PATENT DOCUMENTS

| | | |
|---|---|---|
| WO | 2008/097965 | 8/2008 |
| WO | 2010/002692 | 1/2010 |
| WO | 2010/071713 | 6/2010 |
| WO | 2010/149035 | 12/2010 |
| WO | 2012/041255 | 4/2012 |

OTHER PUBLICATIONS

CMCC, "Framework and procedure of in-device coexistence interference avoidance," 3GPP TSG-RAN WG2 Meeting #72, R2-106382, Nov. 15-19, 2010.

Samsung, "Possible TDM Solution for LTE, VViFi and BT In-device Coexistence," 3GPP TSG-RAN WG2 #71bis, R2-105572, Oct. 11-15, 2010.

Qualcomm Incorporated, "Types of TDM Solutions for LTE ISM Coexistence," 3GPP TSG-RAN WG2 Meeting #71-bis, R2-105764, Oct. 11-15, 2010.

Qualcomm Incorporated, "Requirements on gap patterns for TDM solutions to LTE ISM coexistence scenarios," 3GPP TSG-RAN WG2 Meeting #71-bis, R2-105767, Oct. 11-15, 2010.

* cited by examiner

APPARATUS AND METHOD FOR CONTROLLING COEXISTENCE INTERFERENCE WITHIN DEVICE IN WIRELESS COMMUNICATION SYSTEM

CROSS REFERENCE TO RELATED APPLICATIONS

This application is the National Stage Entry of International Application PCT/KR2012/000144, filed on Jan. 6, 2012, and claims priority from and the benefit of Korean Patent Application No. 10-2011-0001971, filed on Jan. 7, 2011, which are incorporated herein by reference for all purposes as if fully set forth herein.

BACKGROUND OF THE INVENTION

1. Field

The present invention relates to wireless communication and more particularly, an apparatus and a method for coordinating in-device coexistence interference based on time division multiplexing (TDM) scheme in a wireless communication system.

2. Background

A conventional wireless communication system exploits a single frequency band for data transmission. For example, the second-generation wireless communication system uses bandwidth of 200 KHz to 1.25 MHz while the third-generation wireless communication system uses bandwidth of 5 MHz to 10 MHz. To meet the demand for ever-increasing transmission capacity, the recent 3GPP (3rd Generation Partnership Project) LTE (Long Term Evolution) or IEEE 802.16m is expanding the bandwidth up to 20 MHz or more. Although it is essential to increase bandwidth to meet the demand for high transmission capacity, supporting high bandwidth even when quality of service required is low may incur large power consumption.

In this respect, multiple component carrier systems are now emerging, which define a carrier wave to use a predetermined frequency band and center frequency and support broadband data transmission and/or reception through a plurality of carrier waves. Both narrow and broadband data communication are supported by utilizing one or more carrier waves. For example, if a carrier wave corresponds to the bandwidth of 5 MHz, a maximum bandwidth of 20 MHz can be supported by using four carrier waves.

Due to ubiquitous access networks today, users at different places are able to connect to networks different from each other and continuously maintain connectivity to the networks wherever they may be. In a conventional use case where a UE is allowed to communicate with only a single network system, the user has to carry different types of devices supporting the respective systems. As functions implemented in a single UE are advanced and diversified these days, however, even a single UE can perform communication with multiple network systems simultaneously and user's convenience is greatly enhanced.

However, in case a single UE performs communication simultaneously through frequency bands of a plurality of network systems, in-device coexistence interference may occur. In-device coexistence interference refers to such kind of interference that causes interference caused by data transmission in a particular frequency band on another frequency band. For example, in case a single UE supports the Bluetooth and LTE (Long Term Evolution) system together, the in-device coexistence interference may be developed between the frequency bands of the Bluetooth and the LTE system.

The in-device coexistence interference is usually generated when separation between boundaries of frequency bands in a heterogeneous network system is not wide enough.

Frequency division multiplexing (FDM) and time division multiplexing (TDM) may be used as the technique to avoid in-device coexistence interference. The FDM technique controls in-device coexistence interference developed between a first frequency band of a first network system and a second frequency band of a second network system by shifting the frequency band of either of the network systems. On the other hand, the TDM technique controls the in-device coexistence interference by separating transmission time of the first network system from reception time of the second network system. However, there still needs an agreement about a specific operating procedure between a UE and an eNB for controlling in-device coexistence interference.

SUMMARY

An object of the present invention is to provide an apparatus and method for controlling in-device coexistence interference.

Another object of the present invention is to provide an apparatus and method for triggering transmission of assistance information according to in-device coexistence interference in a wireless communication system.

A yet another object of the present invention is to provide an apparatus and method for transmitting information about in-device coexistence interference in a wireless communication system.

A still another object of the present invention is to provide an apparatus and method for controlling in-device coexistence interference based on TDM technique.

According to one aspect of the present invention, provided is a method for controlling interference due to a UE in a wireless communication system. The method comprises performing triggering a request for controlling interference caused by transmission through a first frequency band of a first network system performed in a UE on reception through a second frequency band of a second network system performed in the UE; transmitting to an eNB assistance information including information about a time interval unavailable or available for the first or the second network system due to the interference; and receiving from the eNB response information accepting or rejecting control of the interference in response to the assistance information.

According to another aspect of the present invention, provided is a UE controlling interference in a wireless communication system. The UE comprises a triggering unit performing triggering a request for controlling interference caused by transmission through a first frequency band of a first network system performed in a UE on reception through a second frequency band of a second network system performed in the UE; an assistance information generating unit generating assistance information including information about a time interval unavailable or available due to the interference; an assistance information transmitting unit transmitting the assistance information to an eNB; and a response information receiving unit receiving from the eNB response information accepting or rejecting control of the interference in response to the assistance information.

According to yet another aspect of the present invention, provided is a method for controlling interference due to an eNB in a wireless communication system. The method comprises receiving from a UE assistance information requesting coordination of interference caused by transmission through a first frequency band of a first network system performed in the UE on reception through a second frequency band of a second network system performed in the UE; and transmitting to the UE response information accepting or rejecting control of the interference in response to the assistance information.

The assistance information includes information about a time interval unavailable or available for the first or the second network system due to the interference.

According to still another aspect of the present invention, provided is an eNB controlling interference in a wireless communication system. The eNB comprises an assistance information receiving unit receiving assistance information requesting coordination of interference caused by transmission through a first frequency band of a first network system performed in a UE on reception through a second frequency band of a second network system performed in the UE; a response information generating unit generating response information accepting or rejecting control of the interference in response to the assistance information; a response information transmitting unit transmitting the response information to the UE; and an interference coordinator performing control of the interference.

The assistance information includes information about a time interval unavailable or available for the first or the second network system due to the interference.

According to the present invention, the process of resolving coexistence interference within the device can be simplified and implementation thereof can be easily achieved and reverse compatibility with other existing processes can be maintained. Also, information about in-device coexistence interference exchanged between a UE and an eNB can be clearly defined and interference in the time domain can be effectively resolved.

DETAILED DESCRIPTION OF THE ILLUSTRATED EMBODIMENTS

In what follows, part of the embodiments of the present document will be described in detail with reference to exemplary drawings. In assigning reference symbols to constituting elements in each drawing, it should be noted that the same symbols are assigned to the same constituting elements as possibly as can be even though they appear in different drawings. Also, in describing embodiments of the present invention, if it is determined that detailed description of a related structure or function known for those in the art obscures the technical principles of the present invention, the corresponding description will be omitted.

Also, in describing constituting elements of the present document, terms such as first, second, A, B, (a), (b), and the like can be used. Those terms are introduced only for the purpose of distinguishing a constituting element from the others; therefore, inherent characteristics, order, or sequence of the corresponding constituting element is not limited by the terms. If a particular constituting element is described to be "linked to", "combined with", or "connected to" a different constituting element, it should be understood that the constituting element can be directly linked or connected to the different constituting element but a third constituting element can also be "linked to", "combined with", or "connected to" the individual constituting elements.

Also, the present document is related to a wireless communication system; tasks performed in a wireless communication system can be carried out while a system controlling the corresponding wireless communication system (for example, an eNB) controls the network or transmits data or the tasks can be carried out in a UE combined with the corresponding wireless network.

Figure 1:
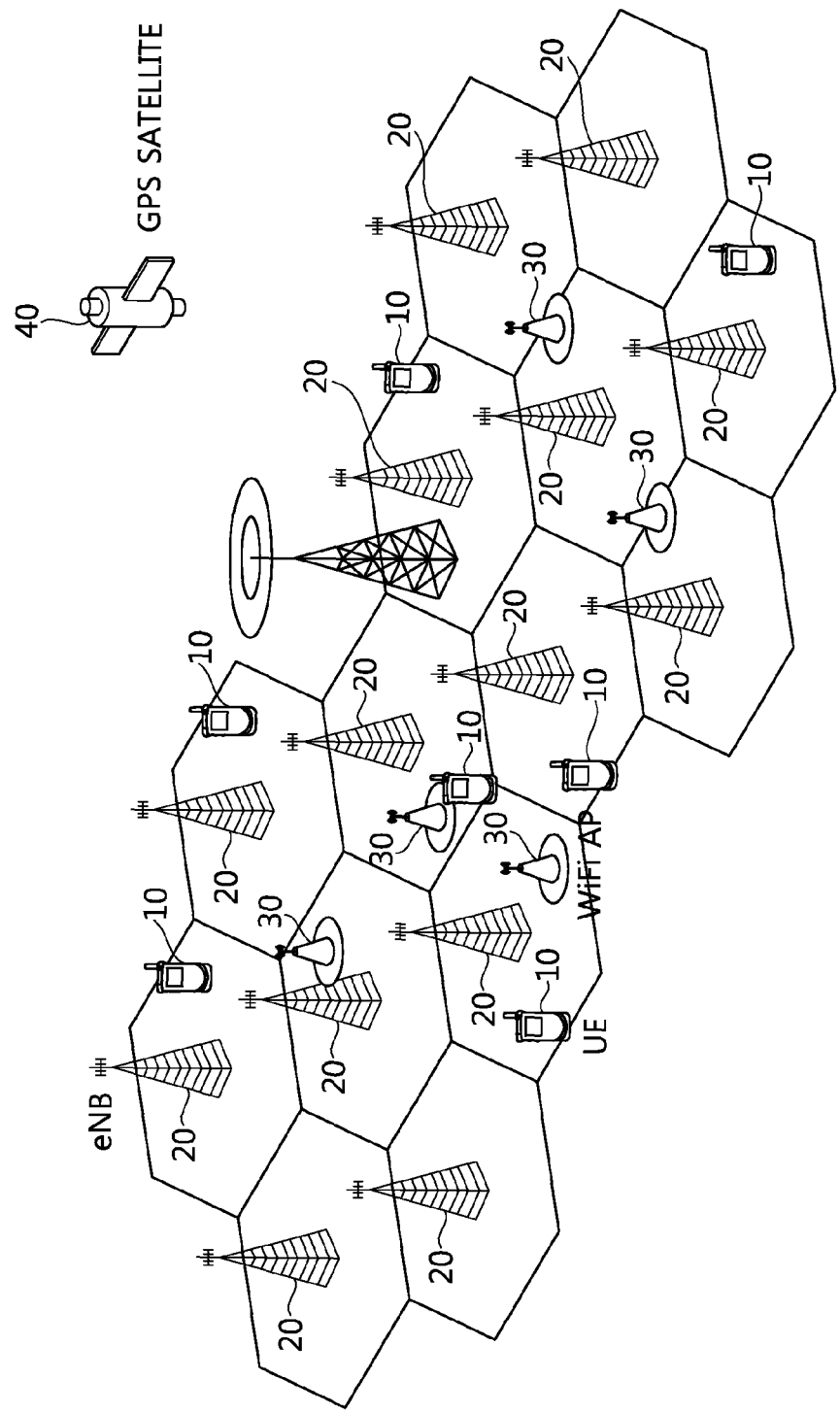
FIG. 1 illustrates a wireless communication system to which embodiments of the present invention are applied.

FIG. 1 illustrates a wireless communication system to which embodiments of the present invention are applied.

With reference to FIG. 1, a wireless communication system is widely deployed for providing various communication services such as voice, packet data, and so on; and comprises a user equipment (UE) 10, an eNB (evolved NodeB, eNodeB, eNB) 20, a wireless LAN access point (AP) 30, GPS (Global Positioning System) 40, and satellites. Here, wireless LAN refers to a device supporting the IEEE 802.11 technology, a wireless communication standard, and the IEEE 802.11 can be used interchangeably with the WiFi system.

The UE 10 can be located within a coverage formed by a plurality of networks such as a cellular network, wireless LAN, broadcast network, satellite network, and so on. The latest UE 10 is equipped with a plurality of wireless transceivers to connect to various services and networks such as an eNB 20, wireless LAN access point 20, GPS 40, and so on at any place and time. For example, a smart phone is equipped with an LTE, WiFi, and Bluetooth transceiver and a GPS receiver. In this respect, design of UE 10 is getting more complicated to ensure good performance and at the same time, to incorporate much more transceivers into the same UE 10. Therefore, this trend raises the possibility of occurrence of in-device coexistence interference even larger.

In what follows, downlink transmission refers to communication from the eNB 20 to the UE 10 while uplink transmission refers to communication from the UE to the eNB 20. In the downlink transmission, a transmitter may be part of the eNB 20 while a receiver may be part of the UE 10. Similarly, in the uplink transmission, the transmitter may be part of the UE 10 while the receiver may be part of the eNB 20.

The UE 10 may be stationary or mobile and can be referred to by different terms such as a mobile station (MS), user terminal (UT), subscriber station (SS), mobile terminal (MT), wireless device, and the like. The eNB 20 refers to a fixed station communicating with the UE 10 and can be referred to by different terms such as a base station (BS), base transceiver system (BTS), access point, Femto BS, relay, and the like.

There is no limitation on the multiple access techniques used for a wireless communication system. Various multiple access techniques such as CDMA (Code Division Multiple Access), TDMA (Time Division Multiple Access), FDMA (Frequency Division Multiple Access), OFDMA (Orthogonal Frequency Division Multiple Access), SC-FDMA (Single Carrier-FDMA), OFDM-FDMA, OFDM-TDMA, and OFDM-CDMA can be used. For uplink and downlink transmission, a time division duplex (TDD) technique can be used, which carries out data transmission by using different time slots or a frequency division duplex (FDD) technique can be used, which carries out data transmission by using different frequency bands.

Carrier aggregation (CA) supports a plurality of component carriers and is alternatively called spectrum aggregation or bandwidth aggregation. An individual carrier wave grouped together by carrier aggregation is called a component carrier (in what follows, it is called CC). Each CC is defined by its bandwidth and center frequency. Carrier aggregation is employed to support growing throughput, prevent increase of costs due to broadband RF (Radio Frequency) devices, and ensure compatibility with the existing systems. For example, if five CCs are allocated with granularity of 5 MHz bandwidth for each carrier, a maximum of 25 MHz bandwidth can be supported. In what follows, a multiple carrier system refers to the system supporting carrier aggregation. The wireless communication system of FIG. 1 can be a multiple carrier system.

According to carrier aggregation, frequency band of a system can comprise a plurality of carrier frequency. Here, carrier frequency refers to the center frequency of a cell. A cell denotes a downlink CC and an uplink CC. Similarly, a cell can denote a combination of a downlink CC and an optional uplink CC. Also, in the usual case where carrier aggregation is not considered, a single cell is constructed always in the form of a pair of a downlink and uplink CC.

Figure 2:
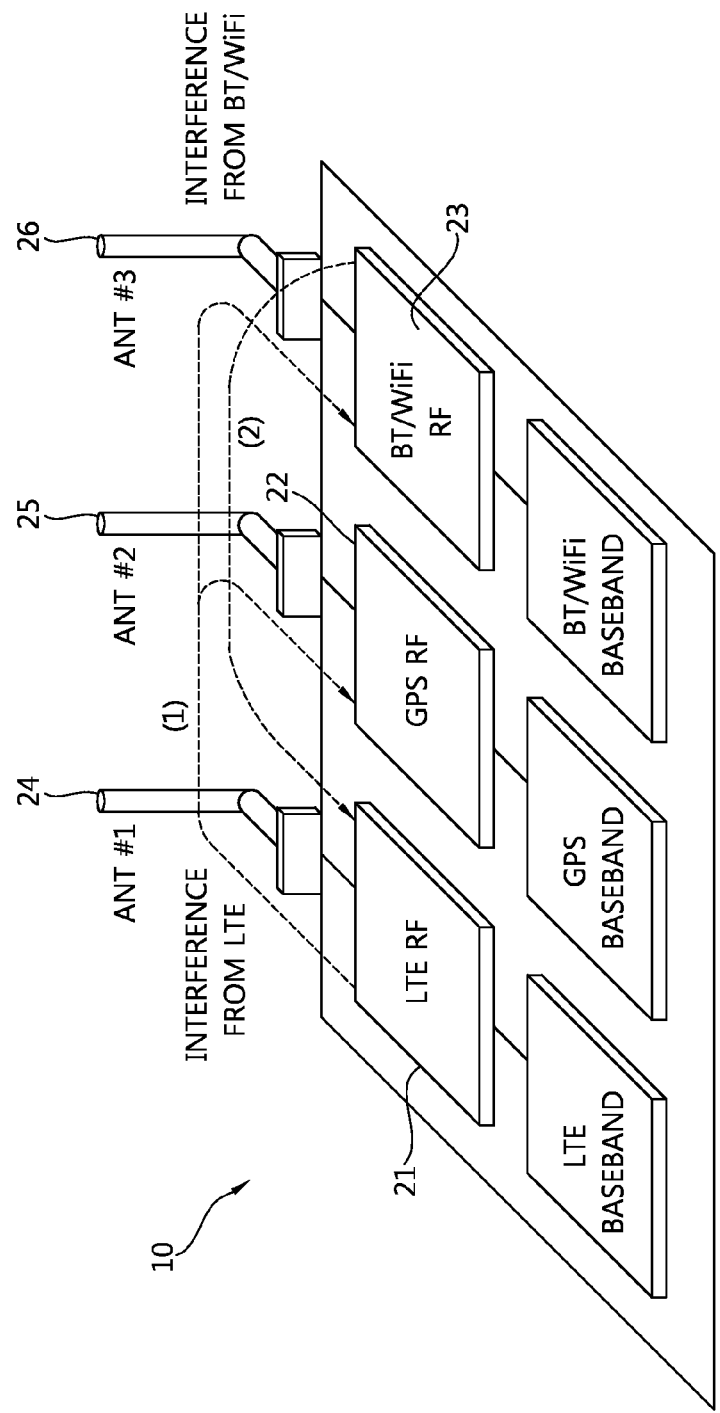
FIG. 2 illustrates in-device coexistence interference.

FIG. 2 illustrates in-device coexistence interference.

With reference to FIG. 2, the UE 10 comprises an LTE RF module 21, GPS RF module 22, and Bluetooth/WiFi RF module 23. A transmit and receive antenna 24, 25, 26 is connected to each RF module. In other words, various types of RF modules are installed close to each other within a single device platform. At this time, transmission power of one RF module can be much larger than the reception power level onto other RF receivers. In this case, if frequency spacing between RF modules is not large enough and a sophisticated filtering technique is not available, a transmission signal from an arbitrary RF module can easily cause significant interference on the receivers of other RF modules within the same device. For example, (1) is an example where a transmission signal of the LTE RF module 21 causes in-device coexistence interference on the GPS RF module 22 and the Bluetooth/WiFi RF module 23; and (2) is an example where a transmission signal of the Bluetooth/WiFi RF module 23 causes in-device coexistence interference on the LTE RF module 21.

Figure 3:
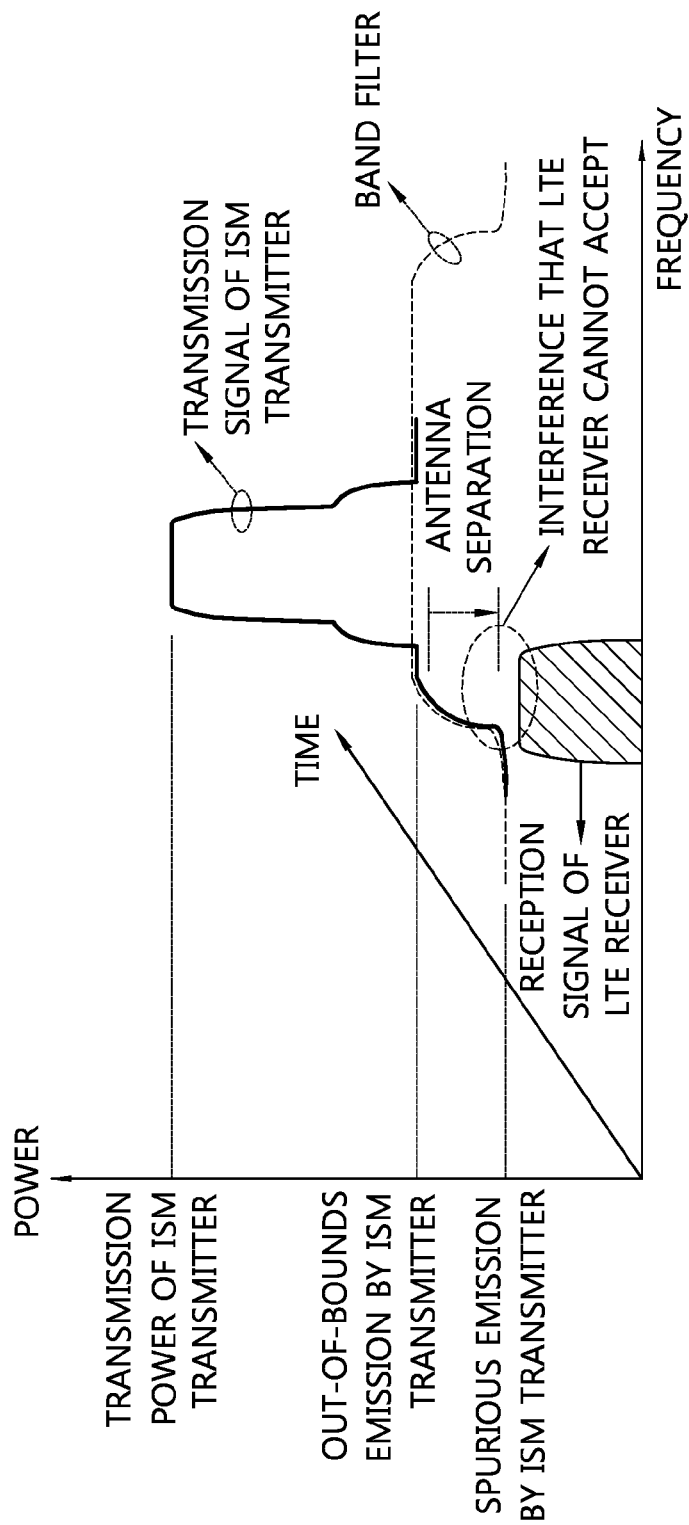
FIG. 3 is an example illustrating in-device coexistence interference acting on an LTE receiver from an ISM transmitter.

FIG. 3 is an example illustrating in-device coexistence interference acting on an LTE receiver from an ISM transmitter. ISM (Industrial, Scientific and Medical) band refers to the frequency bands that can be used freely without permission for industrial, scientific and medical purposes.

With reference to FIG. 3, the radio band of a signal received by the LTE receiver overlaps the radio band of a transmission signal of the ISM transmitter. In this case, in-device coexistence interference can be developed.

Figure 4:
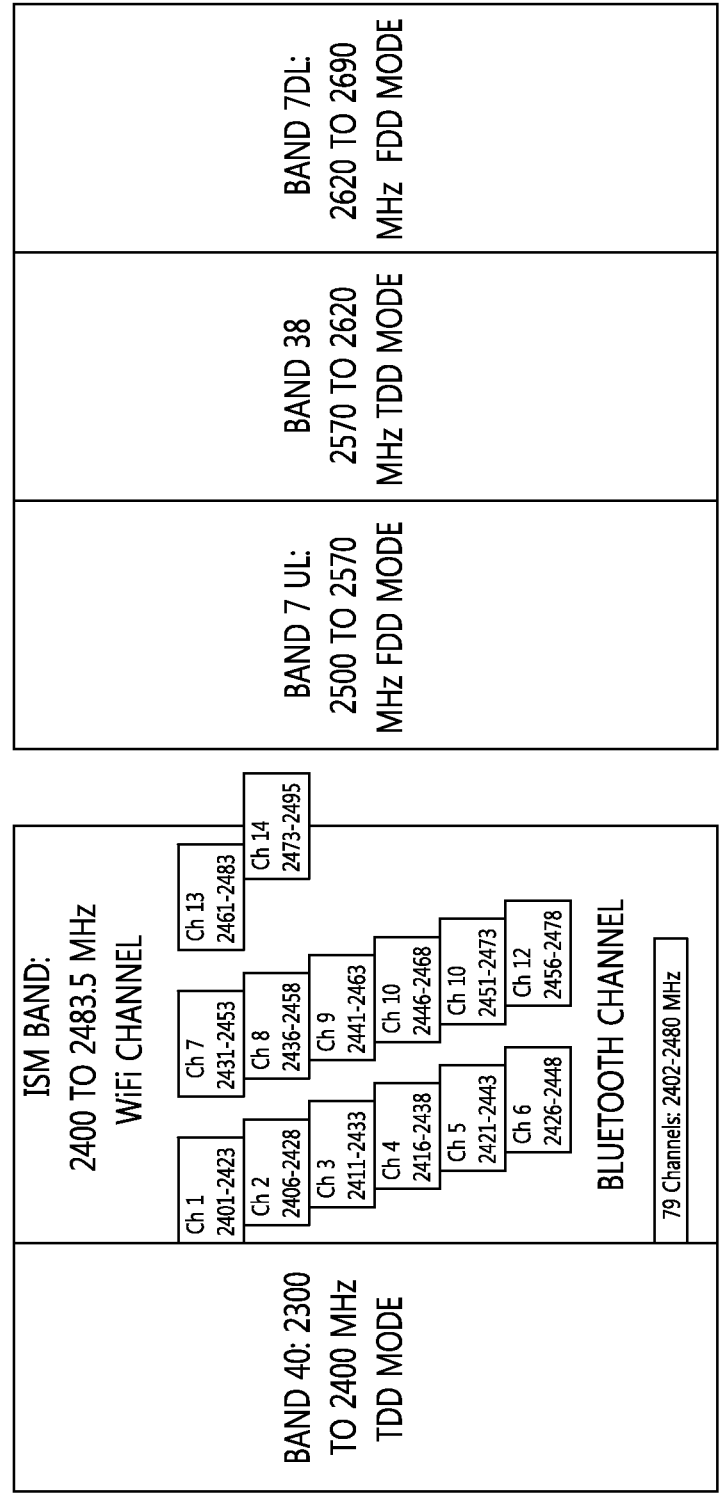
FIG. 4 illustrates a frequency band divided into the ISM band and the LTE band.

FIG. 4 illustrates a frequency band divided into the ISM band and the LTE band.

With reference to FIG. 4, radio band 40, 7, and 38 belong to the LTE band. The radio band 40 occupies the frequency range from 2300 to 2400 MHz in the TDD mode while the radio band 7 occupies the frequency range from 2500 to 2570 MHz as an uplink in the FDD mode. And the radio band 38 occupies the frequency range from 2570 to 2620 MHz in the TDD mode. Meanwhile, the ISM band is used for a WiFi channel and a Bluetooth channel and occupies the frequency range from 2400 to 2483.5 MHz. Here, in-device coexistence interference situations are summarized in the Table 1.

TABLE 1

| Interference band | Type of interference |
| --- | --- |
| Band 40 | ISM Tx → LTE TDD DL Rx |
| Band 40 | LTE TDD UL Tx → ISM Rx |
| Band 7 | LTE FDD UL Tx → ISM Rx |
| Band 7/13/14 | LTE FDD UL Tx → GPS Rx |

With reference to Table 1, the notation of 'a→b' representing type of interference indicates a situation where transmission of a causes in-device coexistence interference on reception of b. Therefore, in the radio band 40, transmission in the ISM band causes in-device coexistence interference on the TDD downlink reception (LTE TDD DL Rx) of the LTE band. Although a filtering scheme may somewhat alleviate the in-device coexistence interference, it is not sufficient. If FDM or TDM technique is applied in addition to the filtering scheme, in-device coexistence interference can be alleviated more efficiently.

Figure 5:
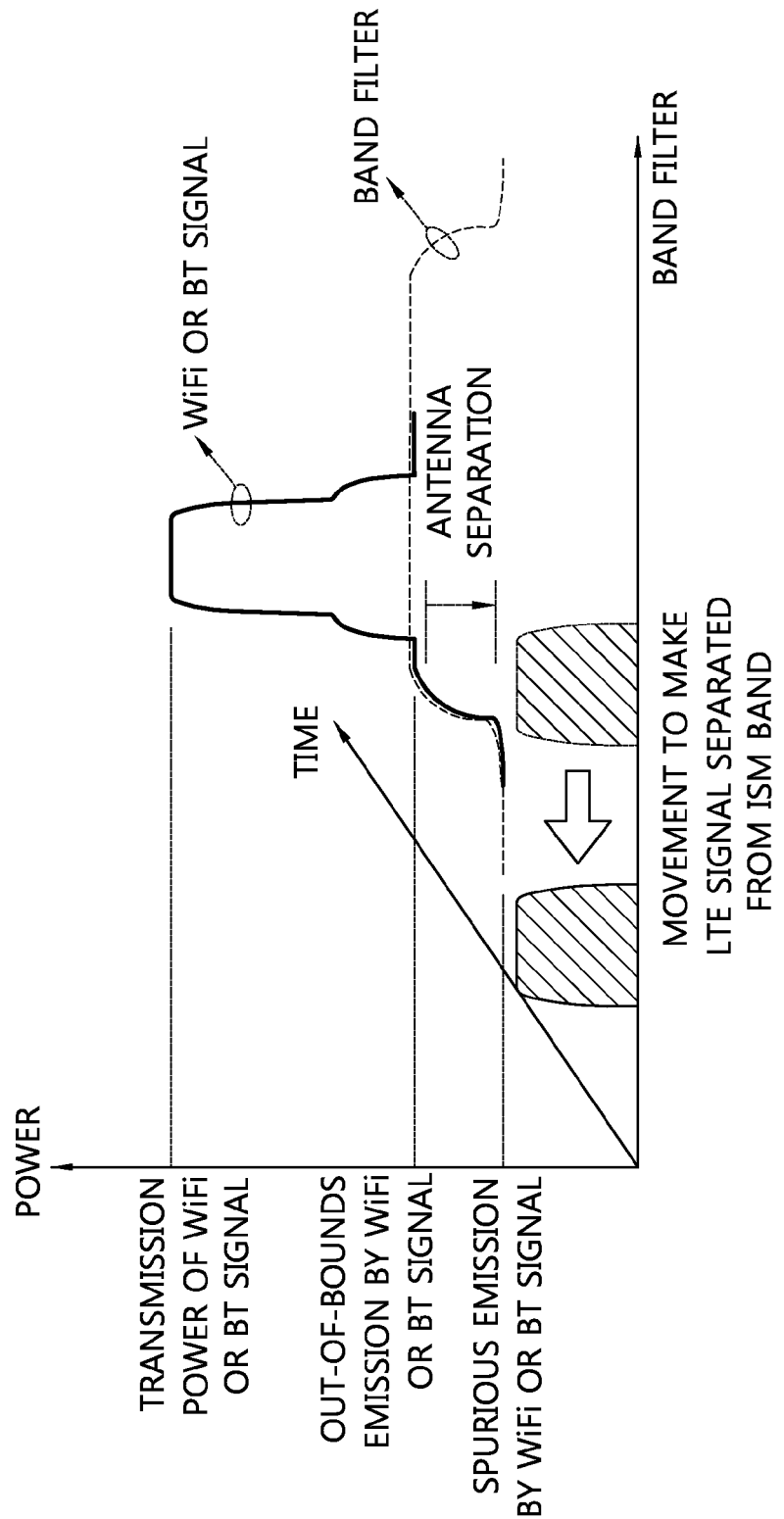
FIG. 5 illustrates one example where in-device coexistence interference is relieved by employing the FDM technique.

FIG. 5 illustrates one example where in-device coexistence interference is relieved by employing the FDM technique.

With reference to FIG. 5, the LTE band can be shifted to avoid overlapping with the ISM band. And as a result, this introduces a handover of the UE from the ISM band. However, to this end, there needs a method for legacy measurement or new signaling to accurately triggering a mobility procedure or radio link failure (RLF) procedure.

Figure 6:
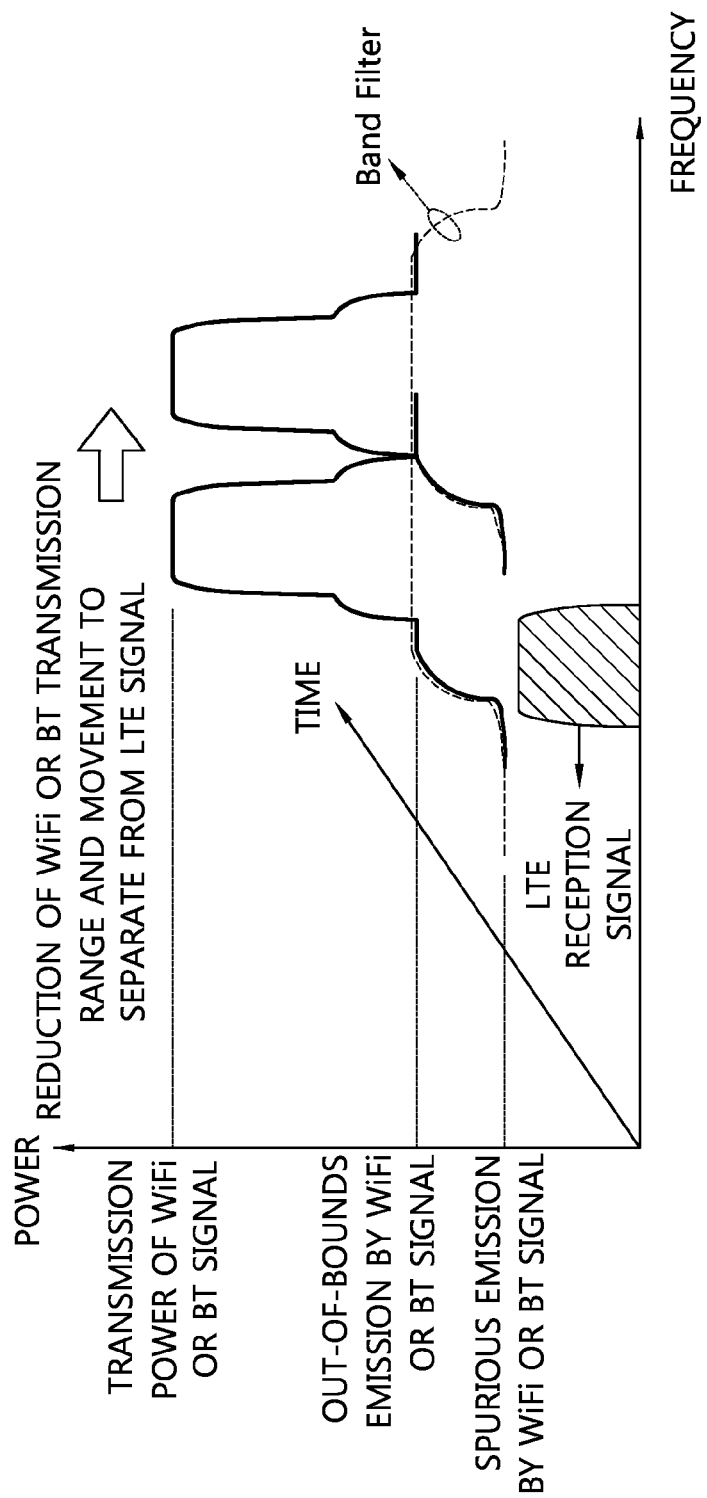
FIG. 6 illustrates another example where in-device coexistence interference is relieved by employing the FDM technique.

FIG. 6 illustrates another example where in-device coexistence interference is relieved by employing the FDM technique.

With reference to FIG. 6, the ISM band can be reduced and moved away from the LTE band. However, this technique can cause a backward compatibility problem. In the case of Bluetooth, the backward compatibility problem can be somewhat relieved due to an adaptive frequency hopping mechanism but it may not be the case for WiFi.

Figure 7:
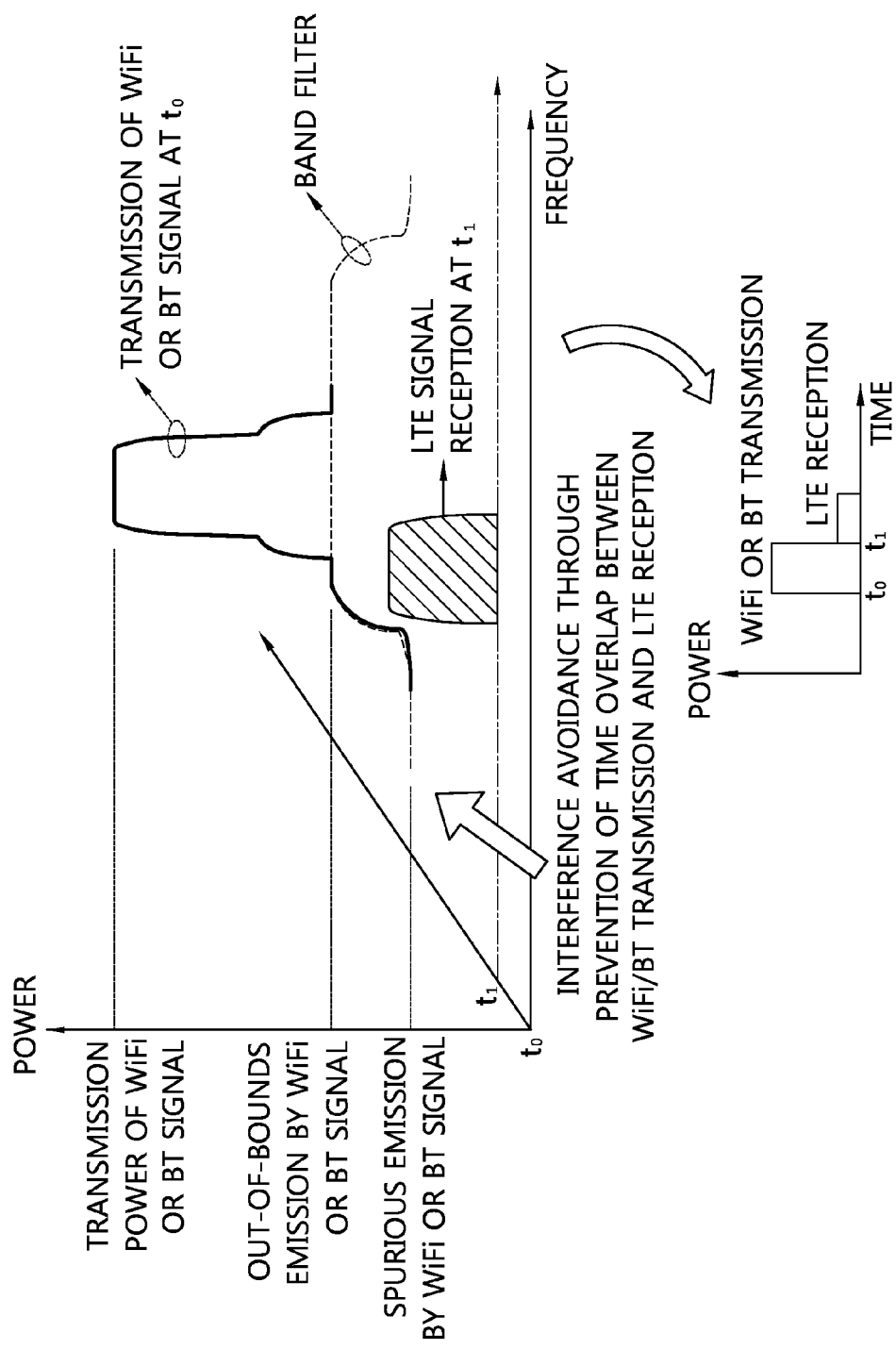
FIG. 7 illustrates one example where in-device coexistence interference is mitigated by employing the TDM technique.

FIG. 7 illustrates one example where in-device coexistence interference is mitigated by employing the TDM technique.

With reference to FIG. 7, if reception timing in the LTE band is made not to overlap with transmission timing in the ISM band, in-device coexistence interference can be avoided.

For example, if a signal belonging to the ISM band is transmitted at time $t_0$, a signal belonging in the LTE band is made to be received at time $t_1$.

Figure 8:
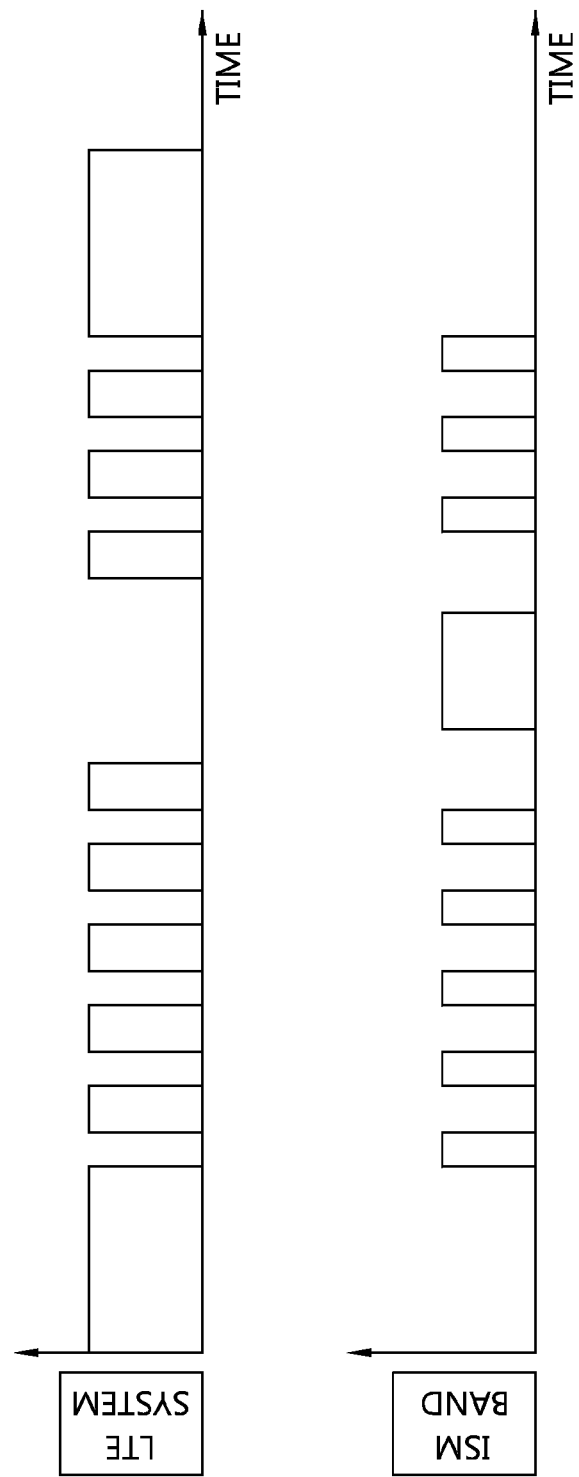
FIG. 8 illustrates a transmit and receive timing in the time axis of the LTE and the ISM band employing the TDM technique.

In this way, a transmit and receive timing employing the TDM technique along the time axis for a signal in the LTE and ISM band can be represented as shown in FIG. 8. By adopting the scheme as described above, in-device coexistence interference can be avoided without incorporating band-to-band movement of the LTE and ISM band. The radio interval of FIG. 8 where signal transmission is not carried out for each band is called a blank transmission interval.

As described above, each of the TDM and FDM technique has its own characteristics. The TDM technique can also be applied for such a situation where only one carrier band is allocated for the UE; however, since temporal resources are shared among network systems, interference may become too severe or communication may be almost impossible depending on the type of traffic utilized for the UE. Although the FDM technique cannot be applied for such a case where only one carrier band is set up for the UE, since the technique is capable of completely avoiding a band affected by interference, occurrence of interference is less sensitive to the type of traffic than for the TDM technique. If the TDM and FDM technique are combined together to carefully complement disadvantages of the two techniques, interference can be controlled more efficiently.

Figure 9:
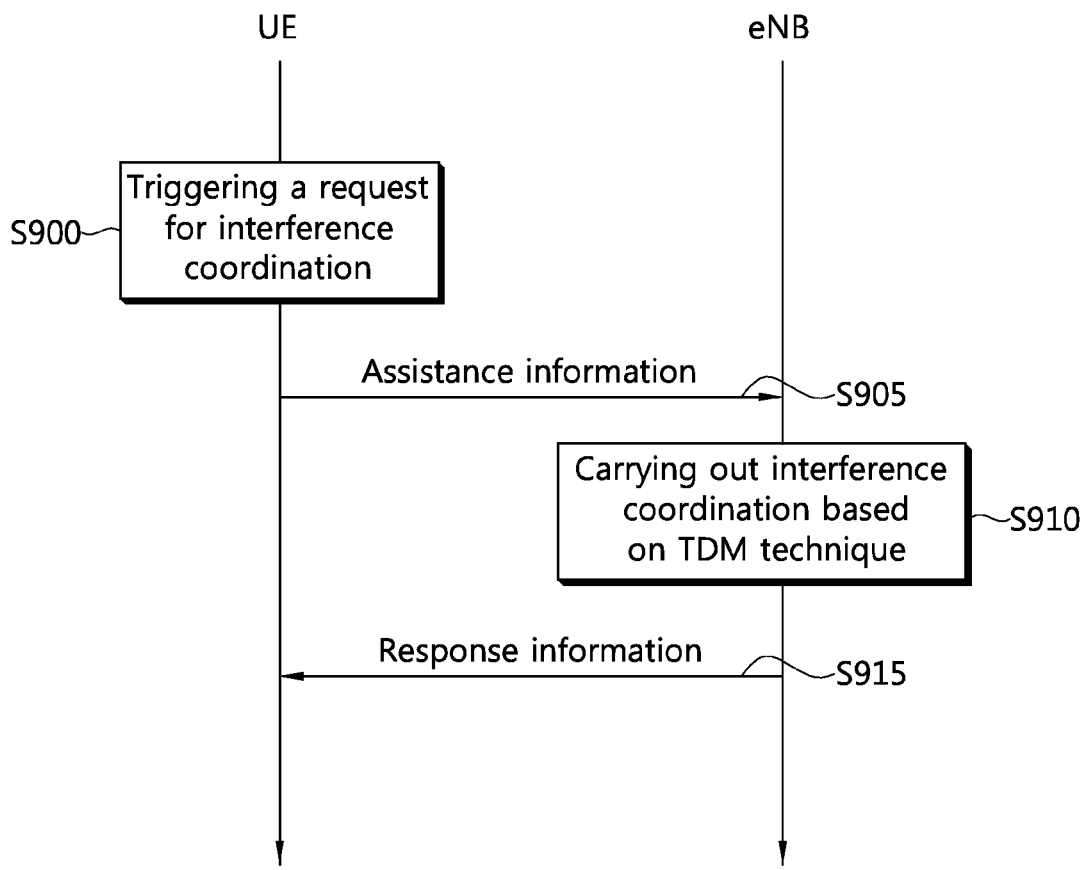
FIG. 9 is a flow diagram illustrating a method for transmitting information about in-device coexistence interference according to one embodiment of the present invention.

FIG. 9 is a flow diagram illustrating a method for transmitting information about in-device coexistence interference according to one embodiment of the present invention.

With reference to FIG. 9, the UE triggers a request for controlling interference based on the TDM technique S900. As described below, there can be three different cases where a request for controlling interference based on the TDM technique is triggered. It should be noted that the following three cases are just examples and thus, the technical principles of the present invention are not limited to the examples shown below.

(1) Detection of in-device coexistence interference: this applies for the case where the UE carries out transmission through a first network system and reception through a second network system and the UE detects interference acting on the reception by the transmission. For example, this corresponds to a case where the UE detects interference caused by transmission based on Bluetooth or WiFi on the reception in the LTE system. In the case of FIG. 2, the UE detects whether a transmission signal from Bluetooth or WiFi RF module 23 causes interference on a reception signal of the LTE RF module 21. As one example, the UE can detect in-device coexistence interference by using a signal-to-interference noise ratio (SINR).

As another example, the UE can detect in-device coexistence interference by using RSRP (Reference Signal Received Power) or RSRQ (Reference Signal Received Quality). For example, suppose that the UE transmits a signal y through a different RF module such as a WiFi module while receiving a signal x from a eNB through the LTE RF module. At this time, when the SINR of the signal y is large enough to exceed a predetermined threshold value and acts as interference on the signal x, the UE can detect occurrence of in-device coexistence interference.

(2) Rejection of interference coordination based on FDM technique: this applies for the case where interference coordination based on the FDM technique is not allowed though the UE requests from the eNB interference coordination based on the FDM technique. As one example, this may correspond to a case where the UE receives from the eNB response information indicating that interference coordination based on the FDM technique cannot be carried out. Similarly, it may be the case where the UE requests interference coordination based on the FDM technique but a response to the request is not received for a predetermined time period. Or it may correspond to a case where the UE request interference coordination based on the FDM technique but it receives response information commanding carrying out interference coordination based on the TDM technique other than the FDM technique. The above scenario is intended to recommend that the UE should carry out interference coordination based on the TDM technique as an alternative solution since interference coordination is now impossible because of the eNB's decision. At this time, the response information may include specific TDM pattern information or an indicator indicating triggering interference coordination based on the TDM technique.

(3) Failure of interference coordination: this applies for the case where interference problem is not resolved up to an expectation level even though interference coordination based on the TDM technique is carried out. Here, an element that determines the expectation level may be a result of channel measurement or an error rate of packet transmission. In other words, degree of interference can be evaluated by the result of channel measurement or error rate of packet transmission. The error rate of packet transmission refers to an error rate of packets received from a device communication with the UE or the 3GPP LTE (3rd Partnership Project Long Term Evolution) eNB. One example of a method for measuring the error rate can be inspection of CRC (Cyclic Redundancy Check) error of HARQ (Hybrid Automatic Repeat request) packets.

At this time, a request for interference coordination is re-triggered for re-attempting interference coordination based on the TDM technique.

Again in the step of S900, if a request for interference coordination is triggered, the UE transmits to the eNB assistance information required for carrying out interference coordination S905. Assistance information can be defined in various ways depending on a view point. For the convenience of description, suppose that transmission Tx through a first network system performed by the UE causes interference on the reception Rx through a second network system performed by the UE in the interference interval $T_1$ to $T_2$ for each period and does not cause interference in the non-interference interval $T_2$ to $T_3$. Since the first network generates interference, it can be called an aggressor system while the second system can be called a victim system since it receives interference.

If the eNB is aware of the interference interval $T_1$ to $T_2$ or the non-interference interval $T_2$ to $T_3$, the eNB can control interference based on the TDM technique by taking into account the intervals.

As one example, the eNB can set up scheduling for the Tx to be performed in the non-interference interval $T_2$ to $T_3$ other than the interference interval $T_1$ to $T_2$. On the other hand, since the Rx is continuously performed in the predetermined interference interval $T_1$ to $T_2$, the scheduling above puts higher priority in the victim system than the aggressor system. At this time, the eNB may correspond to an eNB belonging to the aggressor system.

As an opposite example, the eNB can set up scheduling for the Rx to be performed in the non-interference interval $T_2$ to $T_3$ other than the interference interval $T_1$ to $T_2$. On the other hand, since the Rx is continuously performed in the predetermined interference interval $T_1$ to $T_2$, the scheduling in this case puts higher priority in the aggressor system than the victim system.

As described above, performing interference coordination based on the TDM technique by prioritizing a particular system may be agreed upon beforehand between the UE and the eNB or determined by the eNB according to its own scheduling. For example, suppose the aggressor system is a WiFi system and important information such as system information is transmitted through the interference interval $T_1$ to $T_2$. Since system information has a relatively high priority, if the WiFi system causes interference on other systems in the interval $T_1$ to $T_2$, the eNB controls such that transmission and reception of other systems is not carried out in the interference interval $T_1$ to $T_2$.

As described above, from the standpoint of a system with a low priority, the interference interval can be defined as unusable whereas the non-interference interval can be defined as usable. If the UE informs the eNB of the interference interval (or unusable interval) or the non-interference interval (or usable interval), the eNB can perform interference coordination by referring to the information.

The assistance information can be the information indicating the interference interval (or unusable interval) or the information indicating the non-interference interval (or usable interval). A specific form of the assistance information and a method for indicating the interference or non-interference interval will be described later.

Again, in the step of S905, the eNB receiving the assistance information carries out interference coordination based on the TDM technique S910. Here, interference coordination can be defined as a kind of scheduling that controls timing at which transmission or reception of the UE is carried out.

As one example, the eNB can carry out scheduling based on the interference and non-interference interval. For example, the eNB can set up scheduling such that the UE does not carry out transmission or reception in the interference interval. Or the eNB can set up scheduling such that the UE carries out transmission or reception in the non-interference interval.

As another example, the eNB can carry out a discontinuous reception (DRX) procedure. The DRX procedure can be a DRX command or DRX reconfiguration message, which will be described later.

The eNB transmits to the UE response information accepting or rejecting a request for interference coordination S915. If the eNB determines from the step of S910 that interference coordination based on the TDM technique cannot be carried out, the eNB transmits to the UE response information accepting a request for interference coordination. The response information accepting a request for interference coordination can be varied according to an embodiment of interference coordination based on the TDM technique described in the step of S910. As one example, the response information accepting a request for interference coordination can be a DRX reconfiguration message. As another example, the response information accepting a request for interference coordination can be a DRX command message. As a yet another example, the response information accepting a request for interference coordination can be a simple ACK (acknowledgement).

On the other hand, if the eNB rejects a request for interference coordination, the eNB can transmit NACK (Non-acknowledgement) as response information rejecting a request for interference coordination or the eNB may not respond at all, never transmitting the response information to the UE.

In what follows, the assistance information will be described in more detail. The assistance information can be a message generated in the RRC (Radio Resource Control) layer or MAC (Medium Access Control) layer or can correspond to physical layer signaling.

(1) The assistance information can indicate the interference or non-interference interval for a predetermined time period in the form of bitmap.

Figure 10:
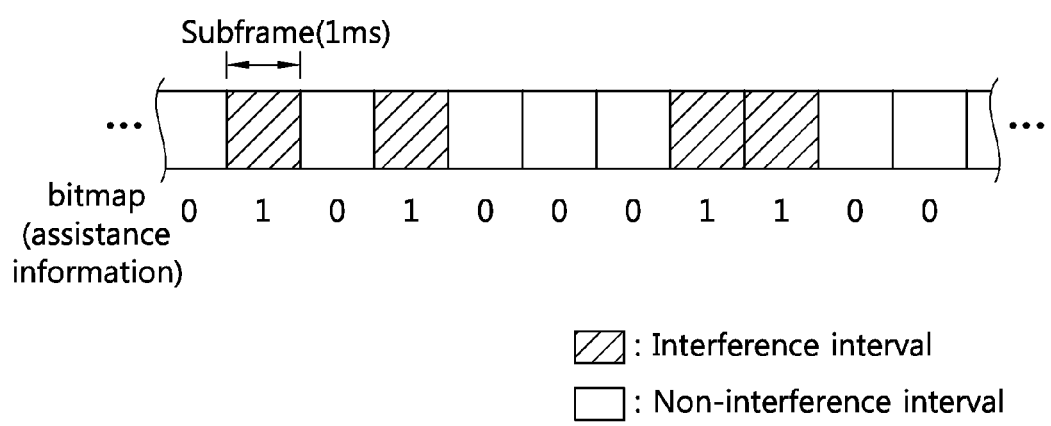
FIG. 10 illustrates assistance information according to one example of the present invention.

FIG. 10 illustrates assistance information according to one example of the present invention.

With reference to FIG. 10, the structure of an LTE frame comprises a plurality of subframes, each of which lasts 1 ms. If it is assumed that an interference interval is defined by units of subframes, each bit constituting the bitmap corresponds to one subframe. For example, if the bitmap is '1', it indicates that the corresponding subframe is an interference interval while if the bitmap is '0', it indicates that the corresponding subframe is a non-interference interval. Of course, what is indicated by the bitmap '1' and '0' can be defined in the opposite way as described above. Although FIG. 10 assumes that the interference interval is defined by the units of subframes, the above assumption is only an example and n subframes can be grouped together to correspond to a single bit as a single interference interval. The interference interval doesn't have to be represented by the units of subframes but can be defined by the units of arbitrary time intervals such as 1.5 ms, 0.8 ms, and so on. Furthermore, in terms of usable or unusable interval for the LTE system, the bitmap '1' can be defined to specify the usable interval while the bitmap '0' can be defined to specify the unusable interval.

Meanwhile, a bitmap indicating an interference interval/non-interference interval of an uplink and a bitmap indicating an interference interval/non-interference interval of a downlink can be distinguished from each other and the interference interval/non-interference interval can be indicated by a single bitmap irrespective of the uplink and downlink.

(2) Assistance information can indicate a time interval that cannot be scheduled (or scheduled).

Figure 11:
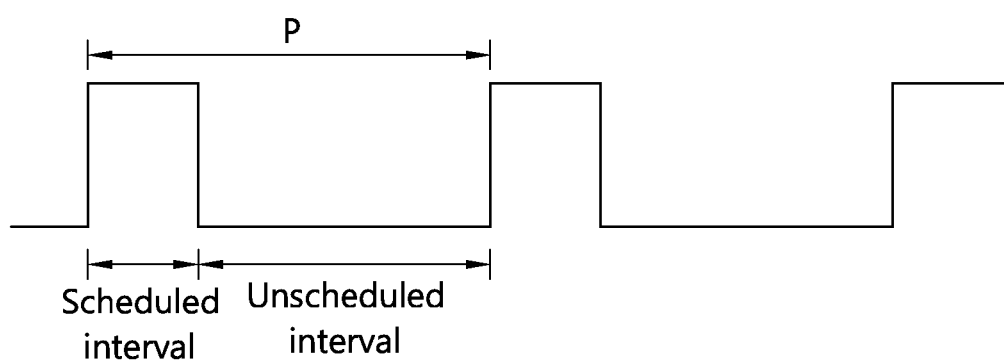
FIG. 11 illustrates assistance information according to another example of the present invention.

FIG. 11 illustrates assistance information according to another example of the present invention.

With reference to FIG. 11, a scheduled interval and a unscheduled interval is repeated for each arbitrary period P for the UE. Here, the scheduled interval refers to an interval for which the UE can be scheduled in a particular network system while the unscheduled interval refers to an interval for which the UE cannot be scheduled in the particular network system.

Therefore, the UE can transmit to the eNB information about either of the scheduled interval or unscheduled interval; or information about both the intervals as assistance information.

(3) Assistance information can indicate a scheduled interval or a unscheduled interval within a DRX period.

Figure 12:
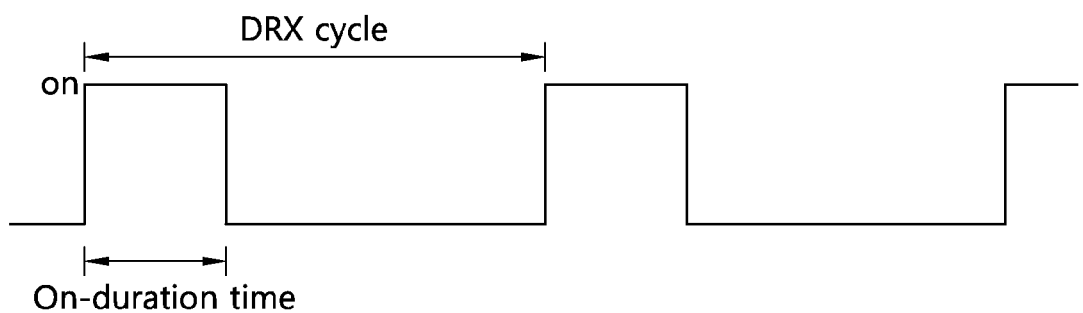
FIG. 12 illustrates assistance information according to a yet another example of the present invention.

FIG. 12 illustrates assistance information according to a yet another example of the present invention.

With reference to FIG. 12, the UE can operate in a DRX mode where a signal is not received for predetermined time duration according to a predetermined DRX period. Parameters determining the DRX mode include a DRX cycle, on-duration time, and an inactivity timer. The DRX cycle is a period at which the UE is woken up from the DRX mode and the on-duration time corresponds to the duration for which the UE is kept in the on-state periodically.

The UE can determine whether a PDCCH scheduled for the UE exists during the on-duration time. If the UE is scheduled for the on-duration time, the UE is kept in the on-state until the scheduling is completed. The time instant at which the scheduling is completed will be the time instant at which the inactivity timer is terminated from the time instant of the last PDCCH scheduling. On the other hand, if PDCCH scheduling does not exist for the on-duration time, the UE re-enters inactivity of the DRX mode after the on-duration time is passed.

At this time, if transmission or reception timing of the UE in the DRX mode is to be changed by interference coordination based on the TDM technique, the change has to be carried out at least within a range that does not influence operation of the DRX cycle. For example, in case transmission or reception of the UE is constrained to be performed for the on-duration time and not for the inactivity duration, the UE needs to inform the eNB of the on-duration time or inactivity duration of the UE. This is intended for the eNB not to allow the UE to be scheduled for the inactivity duration at the time of interference coordination.

As one example, assistance information includes information about the on-duration time or inactivity time itself. As another example, the assistance information includes information about the ratio of the inactivity time to the DRX cycle. For example, if the DRX cycle is 4 ms and the inactivity time is 3 ms, the ratio of the inactivity time to the DRX cycle is ¾ and the ratio information is included in the assistance information.

(4) Assistance information can include information about increase of unscheduled interval. The assistance information can deliver the amount of increase or decrease from the information about increase of unscheduled interval. The amount of increase or decrease can be represented in the form of multiples or additions. In case the assistance information represents the increase or decrease of the unscheduled interval in the form of multiples, the assistance information is represented in the form of N or 1/N. For example, suppose ¼ of the entire DRX cycle is a unscheduled interval. If the amount of increase in the form of multiples is 2, the unscheduled interval is ½. If the amount of increase in the form of multiples is ½, the unscheduled interval is ⅛. The case where the information about increase of unscheduled interval is represented in the form of additions corresponds to addition or subtraction applied to the assistance information. For example, if the amount of increase is ¼, the unscheduled interval is ½ (namely, ¼+¼=½) while if it is −⅛, the unscheduled interval is ⅛ (namely, ¼−⅛=⅛).

(5) Assistance information can include ACK indicator.

In case the eNB recommends interference coordination based on the TDM technique even though the UE requests interference coordination based on the FDM technique, the UE triggers a request for interference coordination based on the TDM technique and transmits assistance information included the ACK indicator to the eNB.

Figure 13:
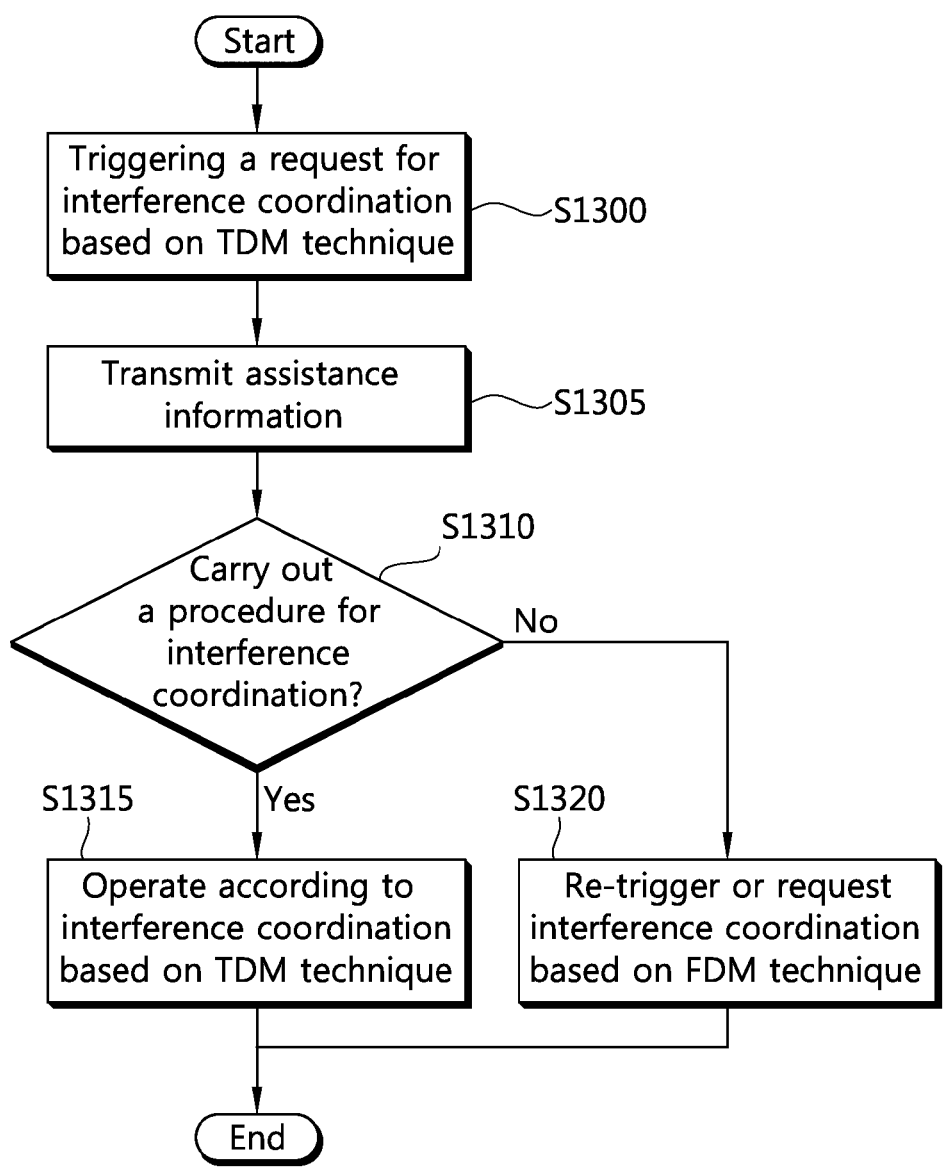
FIG. 13 is a flow diagram illustrating a method for controlling interference performed by a UE according to one example of the present invention.

FIG. 13 is a flow diagram illustrating a method for controlling interference performed by a UE according to one example of the present invention.

With reference to FIG. 13, the UE triggers a request for interference coordination based on the TDM technique S1300. Triggering of a request for interference coordination is carried out due to i) detection of in-device coexistence interference, ii) rejection of interference coordination based on the FDM technique, and iii) failure of interference coordination based on the TDM technique as described in FIG. 9.

The UE transmits assistance information to the eNB S1305. The assistance information is such kind of information that informs of an interference interval in which in-device coexistence interference is generated or a non-interference interval directly or indirectly. As one example, the assistance information can indicate the interference or non-interference interval in a predetermined time period in the form of bitmap. As another example, the assistance information can indicate an unscheduled time interval (or scheduled time interval). As yet another example, the assistance information can indicate a scheduled interval or unscheduled interval in the DRX cycle. As a still another example, the assistance information can include information about increase of unscheduled interval. As a further example, the assistance information can include the ACK indicator.

The UE determines whether interference coordination based on the TDM technique is carried out S1310. As one example, if response information indicating acceptance of interference coordination is received from the eNB in response to the assistance information transmitted by the UE, the UE can determine that a process of interference coordination is supposed to be carried out.

If it is determined that a request for interference coordination is accepted, the UE operates according to interference coordination based on the TDM technique S1315.

If it is determined that a request for interference coordination is rejected, the UE either triggers again the request for interference coordination based on the TDM technique or requests interference coordination based on the FDM technique S1320.

Figure 14:
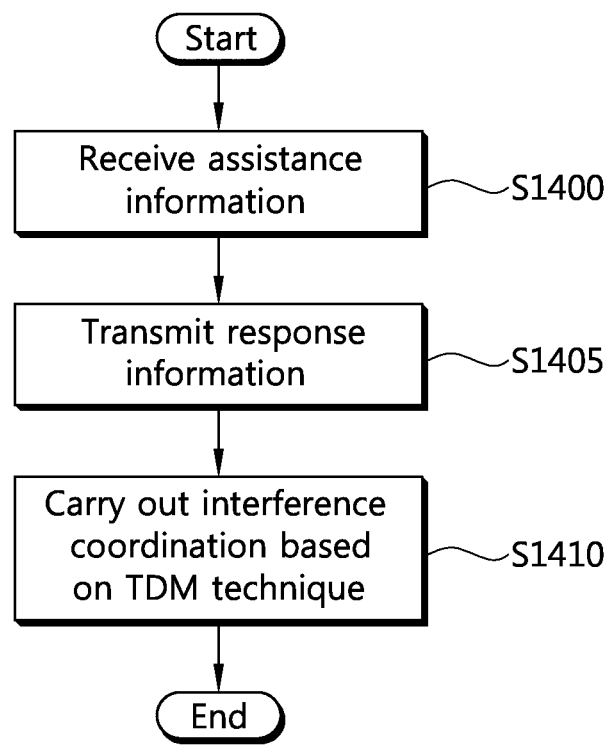
FIG. 14 is a flow diagram illustrating a method for controlling interference performed by an eNB according to one example of the present invention.

FIG. 14 is a flow diagram illustrating a method for controlling interference performed by an eNB according to one example of the present invention.

With reference to FIG. 14, the eNB receives assistance information from the eNB S1400. The assistance information provides information required for controlling in-device coexistence interference based on the TDM technique. The eNB can know the interference in which in-device coexistence interference is generated or non-interference interval from the assistance information.

In response to the reception of the assistance information, the eNB transmits to the UE response information accepting or rejecting a request for interference coordination S1405. If the eNB determines that interference coordination based on the TDM technique cannot be carried out, the eNB transmits to the UE response information rejecting a request for interference coordination. On the other hand, if the eNB determines that interference coordination based on the TDM technique can be carried out, the eNB transmits to the UE response information accepting the request for interference coordination.

The response information can be implemented either by a MAC message or physical layer signaling. As one example, response information accepting a request for interference coordination can correspond to the DRX reconfiguration message. As another example, the response information accepting a request for interference coordination can be a simple ACK. As a yet another example, the response information rejecting a request for interference coordination can be NACK. As a still another example, to reject a request for interference coordination, the eNB can operate in such a way that it does not respond at all, never transmitting the response information.

The eNB carries out interference coordination based on the TDM technique S1410. As one example of interference coordination, the eNB can perform scheduling based on an interference interval and non-interference interval. For example, the eNB can set up scheduling such that transmission or reception of the UE is not carried out in the interference interval while the UE is scheduled in the non-interference interval.

As another example of interference coordination, the eNB carries out a discontinuous reception (DRX) procedure. This applies for the case where the UE operates in the DRX mode and assistance information received from the UE indicates a scheduled interval or unscheduled interval in the DRX cycle.

The DRX procedure can be a DRX command or DRX reconfiguration message. In particular, in case interference coordination is carried out from the DRX command, the UE can operate as shown in FIG. 15.

Figure 15:
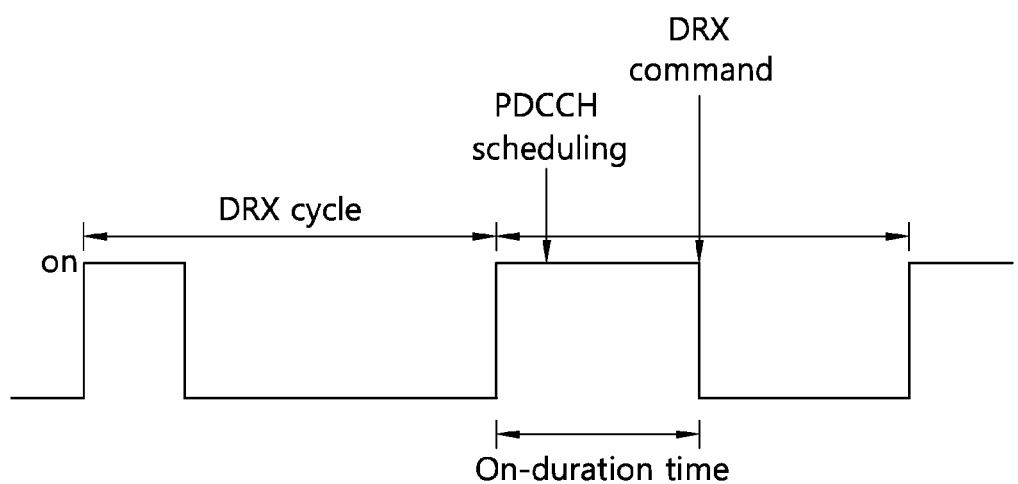
FIG. 15 illustrates operation of a UE entering a DRX mode in case response information according to one example of the present invention is a DRX command message.

With reference to FIG. 15, if a PDCCH scheduling is applied within the DRX cycle, the UE holds the on-duration time. Afterwards, if the DRX command is given, the UE enters the inactivity time. Meanwhile, in case interference coordination is carried out as the DRX reconfiguration procedure, the eNB can control interference by changing DRX configuration parameters.

Figure 16:
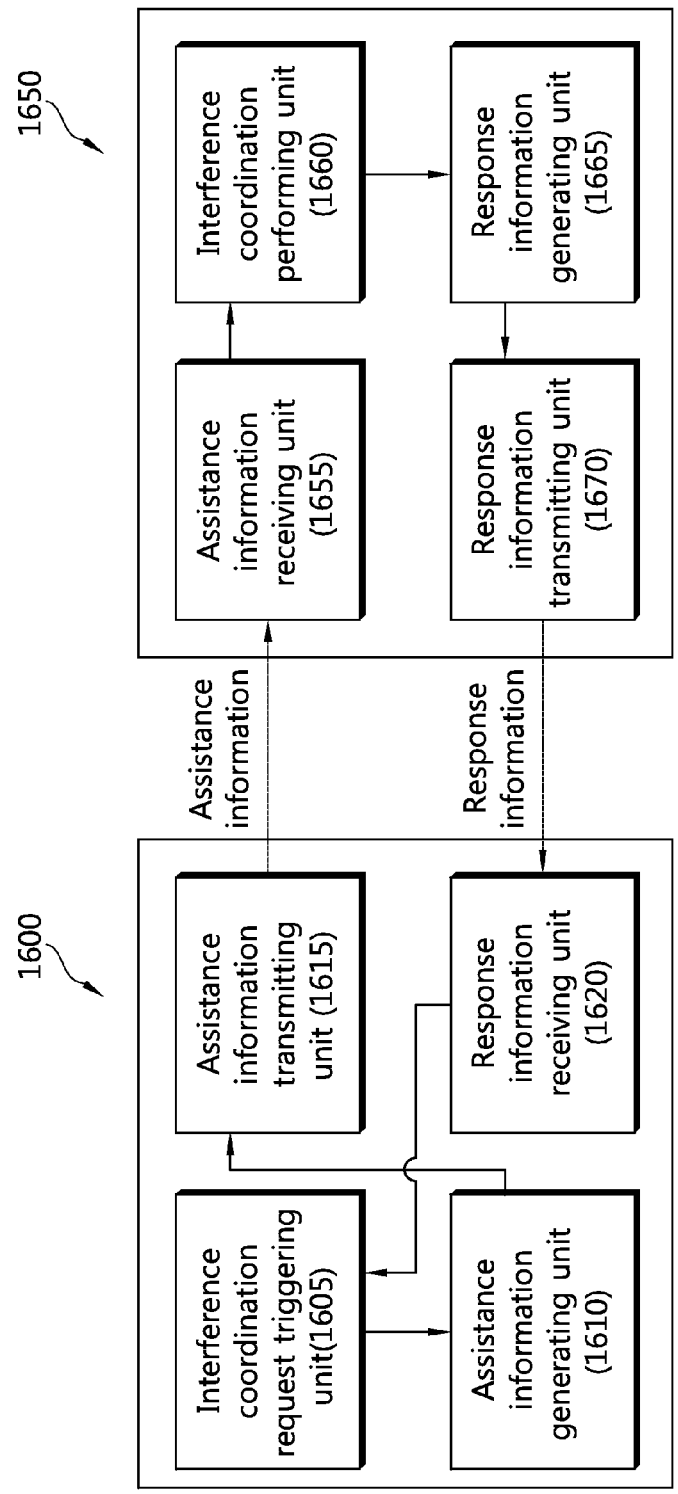
FIG. 16 is a block diagram illustrating an apparatus controlling in-device coexistence interference according to one example of the present invention.

FIG. 16 is a block diagram illustrating an apparatus controlling in-device coexistence interference according to one example of the present invention.

With reference to FIG. 16, the UE 1600 and the eNB 1650 exchanges information about in-device coexistence interference. Information about in-device coexistence interference includes assistance information transmitted by the UE 1600 and response information transmitted by the eNB 1650.

The UE 1600 includes an interference coordination request triggering unit 1605, assistance information generating unit 1610, assistance information transmitting unit 1615, and response information receiving unit 1620.

The interference coordination request triggering unit 1605 triggers a request for interference coordination from the eNB 1650 in case in-device coexistence interference is generated. The in-device coexistence interference can be generated in the following cases.

For example, suppose the UE, while receiving a signal x from the eNB 1650 through the LTE RF module, transmits a signal y through another RF module such as WiFi module. At this time, if the ratio of received signal to interference noise of the signal y exceeds a predetermined threshold value and acts on the signal x as interference, in-device coexistence interference is generated. Here, Although SINR has been used as a reference of interference occurrence, the reference is not limited to the above example but RSRP (Reference Signal Received Power) or RSRQ (Reference Signal Received Quality) can be used as a reference.

The interference coordination request triggering unit 1605 triggers a request for interference coordination if i) in-device coexistence interference is detected; ii) interference coordination based on the FDM technique is rejected; or iii) interference coordination based on the TDM technique fails as described in FIG. 9.

The assistance information generating unit 1610 generates assistance information if a request for interference coordination is triggered. The assistance information is such kind of information that informs an interference interval in which in-device coexistence interference is generated or non-interference interval directly or indirectly. As one example, the assistance information can indicate the interference or non-interference interval in a predetermined time period in the form of bitmap. As another example, the assistance information indicates a unscheduled time interval (or scheduled time interval). As a yet another example, the assistance information indicates a scheduled interval or unscheduled interval within the DRX period. As a still another example, the assistance information includes information about increase of unscheduled interval. As a further example, the assistance information includes ACK indicator.

The assistance information transmitting unit 1615 transmits assistance information to the eNB 1650. At this time, the assistance information transmitting unit 1615 can transmit the assistance information through an RRC message, MAC message, or physical layer signaling.

The eNB 1650 includes an assistance information receiving unit 1655, interference coordination performing unit 1660, response information generating unit 1665, and response information transmitting unit 1670.

The assistance information receiving unit 1655 receives assistance information from the UE 1600.

The assistance coordination performing unit 1660 determines whether to control in-device coexistence interference generated in the UE and carries out interference coordination. As one example, the interference coordination performing unit 1660 can carry out scheduling based on an interference interval and non-interference interval. As one example, the interference coordination performing unit 1660 can set up scheduling such that transmission or reception of the UE is not carried out in the interference interval while the UE is scheduled in the non-interference interval. As another example, the interference coordination performing unit 1660 carries out interference coordination through a DRX procedure. This applies for the case where the UE 1600 operates in the DRX mode and assistance information received from the UE 1600 indicates a scheduled interval or unscheduled interval within the DRX period. The discontinuous reception procedure may correspond to a DRX command or DRX reconfiguration message.

The response information generating unit 1665 generates response information accepting or rejecting interference coordination according to the decision of the interference coordination performing unit 1660. As one example, response information accepting a request for interference coordination can correspond to the DRX reconfiguration message. As another example, the response information accepting a request for interference coordination can be a simple ACK. As a yet another example, the response information rejecting a request for interference coordination can be NACK. As a still another example, to reject a request for interference coordination, the eNB can operate in such a way that it does not respond at all, never transmitting the response information.

The response information transmitting unit 1670 transmits response information to the UE 1600. At this time, the response information transmitting unit 1670 can transmit the response information through an RRC message, MAC message, or physical layer signaling.

Embodiments above are provided to illustrate the technical principles of the present invention; thus, it should be understood that those skilled in the art to which the present invention belongs will be able to change or modify the embodiments in various other ways unless changes or modifications of the embodiments depart from the inherent characteristics of the present invention. Therefore, those embodiments disclosed in this document are not intended to limit the technical principles of the present invention but to describe the technical principles; and the technical scope of the present invention is not limited by those embodiments. The technical scope of the present invention should be interpreted by the appended claims and all the technical principles belonging to the scope equivalent to that defined by the claims should be understood to be included in the claimed scope of the present invention.

The invention claimed is:

1. A method for coordinating in device coexistence (IDC) interference by a user equipment, the method comprising:
triggering a first coordination of IDC interference on reception through a first frequency of a Long Term Evolution (LTE) frequency band;

transmitting, to an eNodeB (eNB), first assistance information for the first coordination, the first assistance information comprising information of the first frequency;

retriggering a second coordination of IDC interference after the first coordination is triggered, the second coordination being based on a Time Division Multiplexing (TDM) technique when a change of the first assistance information occurs;

transmitting, to the eNB, second assistance information for the second coordination; and receiving, from the eNB, a response responsive to the second assistance information, wherein the second assistance information comprises a bitmap for indicating an unusable subframe irrespective of uplink and downlink, wherein a subframe is a usable subframe if a value of the bitmap corresponding to the subframe indicates '1', and the subframe is an unusable subframe if the value of the bitmap corresponding to the subframe indicates '0', and wherein the response comprises information indicating whether the second assistance information is accepted or rejected.

2. The method of claim 1, wherein the first and second assistance information is transmitted by being included in a radio resource control (RRC) message.

3. The method of claim 1, wherein the interference is caused by a transmission through a second frequency, being different from the first frequency.

4. A method for coordinating in device coexistence (IDC) interference by an eNodeB (eNB), the method comprising:

receiving, from a user equipment (UE), first assistance information regarding a first coordination of IDC interference on reception through a first frequency of a Long Term Evolution (LTE) frequency band, the first assistance information comprising information of the first frequency;

receiving, from the UE, second assistance information regarding a second coordination of the interference, the second coordination being based on a Time Division Multiplexing (TDM) technique when a change of the first assistance information occurs; and transmitting, to the UE, a response responsive to the second assistance information, wherein the second coordination is triggered at the UE after the first coordination is triggered, wherein the second assistance information comprises a bitmap for indicating an unusable subframe irrespective of uplink and downlink, wherein a subframe is a usable subframe if a value of the bitmap corresponding to the subframe indicates '1', and the subframe is an unusable subframe if the value of the bitmap corresponding to the subframe indicates '0', and wherein the response comprises information indicating whether the second assistance information is accepted or rejected.

5. The method of claim 4, wherein the first and second assistance information is received by being included in a radio resource control (RRC) message.

6. The method of claim 4, wherein the interference is caused by a transmission through a second frequency, being different from the first frequency.

7. The method of claim 1, wherein the first assistance information comprises a request for Frequency Division Multipelxing (FDM) based IDC coordination.

8. The method of claim 4, wherein the first assistance information comprises a request for Frequency Division Multipelxing (FDM) based IDC coordination.

9. A user equipment (UE) to support in device coexistence (IDC) interference coordination, the UE comprising:

a processor configured to trigger a first coordination of IDC interference on reception through a first frequency of a Long Term Evolution (LTE) frequency band; and a wireless transceiver to transmit, to an eNodeB (eNB), first assistance information for the first coordination, the first assistance information comprising information of the first frequency, wherein the processor is configured to retrigger a second coordination of IDC interference after the first coordination is triggered, the second coordination being based on a Time Division Multiplexing (TDM) technique when a change of the first assistance information occurs, wherein the wireless transceiver transmits, to the eNB, second assistance information for the second coordination, and receives, from the eNB, a response responsive to the second assistance information, wherein the second assistance information comprises a bitmap for indicating an unusable subframe irrespective of uplink and downlink, wherein a subframe is a usable subframe if a value of the bitmap corresponding to the subframe indicates '1', and the subframe is an unusable subframe if the value of the bitmap corresponding to the subframe indicates '0', and wherein the response comprises information indicating whether the second assistance information is accepted or rejected.

10. The UE of claim 9, wherein the first and second assistance information is transmitted by being included in a radio resource control (RRC) message.

11. The UE of claim 9, wherein the interference is caused by a transmission through a second frequency, being different from the first frequency.

12. The UE of claim 9, wherein the first assistance information comprises a request for Frequency Division Multipelxing (FDM) based IDC coordination.

* * * * *